United States Patent [19]

Slater

[11] Patent Number: 5,018,510
[45] Date of Patent: May 28, 1991

[54] PLATFORM FOR WEIGHING AND SIMULTANEOUSLY MASSAGING USER

[76] Inventor: Daniel Slater, 2320 Westwood La., Palatine, Ill. 60067

[21] Appl. No.: 315,329

[22] Filed: Feb. 24, 1989

[51] Int. Cl.$^5$ .............................................. A61H 1/00
[52] U.S. Cl. .............................. 128/33; 177/DIG. 11; 128/36
[58] Field of Search .................... 128/36, 33; 177/216, 177/DIG. 11, 211, 125

[56] References Cited

U.S. PATENT DOCUMENTS

| | | | |
|---|---|---|---|
| 2,053,443 | 9/1936 | Hochriem | 177/125 |
| 2,174,648 | 10/1939 | Solinski | 128/33 |
| 2,222,364 | 11/1940 | Dillon, Jr. et al. | 177/125 |
| 2,271,382 | 1/1942 | Worthington | 128/33 |
| 2,566,484 | 9/1951 | Coury | 128/33 |
| 2,836,980 | 6/1958 | Giepen | 177/125 |
| 2,981,349 | 4/1961 | Douglas | 177/DIG. 11 |
| 3,071,132 | 1/1963 | Lucht | 128/36 |
| 3,461,985 | 8/1969 | Allen | 177/125 |
| 3,826,250 | 7/1974 | Adams | 128/33 |
| 4,632,198 | 12/1986 | Uchinawa | 177/211 |

Primary Examiner—Edgar S. Burr
Assistant Examiner—Tonya Lamb
Attorney, Agent, or Firm—Charles F. Lind

[57] ABSTRACT

The disclosed commerical coin-operated scale-platform massager has a frame, and a foot platform supported by a weight cell movably relative to the frame. The weight cell provides the primary support for the foot platform, and is distorted by the weight of a person standing on the foot platform and calibrated to determine the weight of the person. A driving vibrator in the form of an electric motor having an eccentric weight keyed to its output shaft is mounted on snubber means relative to the frame, and linking means connect the driving vibrator and foot platform together, operable when the driving vibrator is activated to vibrate the foot platform relative to the frame, as a platform massager.

12 Claims, 1 Drawing Sheet

PLATFORM FOR WEIGHING AND SIMULTANEOUSLY MASSAGING USER

BACKGROUND OF THE INVENTION

Commerical coin-operated scales have traditionally found acceptance in individual stores, in shopping malls, or other public places, for the shopper or browser to use in determining his/her weight. However, the person's desire to learn one's weight typically has no relationship to the shopping or brousing activity, which makes its use more of an impulse or spur-of-the-moment activity. Other outputs, such as providing a printed comparison of the person's weight to the average weight for someone of the same sex, age and height, may be used in the scale to broaden its appeal and potential use.

On the other hand, walking or standing on one's feet is almost always an integral part of shopping or brousing, and this activity may tire the feet and legs. Commerical apparatus consisting of a platform that the user can stand on, which platform is then vibrated are available, but such have not yet been widely accepted as a profitable investment, for use in individual stores, in shopping malls, or other public places.

SUMMARY OF THE INVENTION

The main object of the present invnetion is to provide a coin-operated apparatus in the form of a scale-platform massager, to allow someone, with tired feet and legs to become rejouvanated while standing on a platform, while it is being vibrated, and also to be weighed and/or provided with other related informaiton, while standing on the same platform, all to the pleasure and commerical acceptance of the user.

To achieve this and other objects, the present invention may provide a scale-platform massager apparatus having a frame, a foot platform, and means supporting the foot platform movably relative to the frame operable to bear the weight of a person standing on the foot platform and to be calibrated to determine the weight of the person. A driving vibrator is provided, means mount the driving vibrator movably relative to the frame, and means connect the driving vibrator relative to the foot platform, operable when the driving vibrator is activated to vibrate the foot platform relative to the frame.

BRIEF DESCRIPTION OF THE DRAWINGS

Further objects, advantages and features of the present invention will appear from the following disclosure and description, including as a part thereof the accompanying drawings, in which.

DETAILED DESCRIPTION OF AN ILLUSTRATED EMBODIMENT

Figure 1:
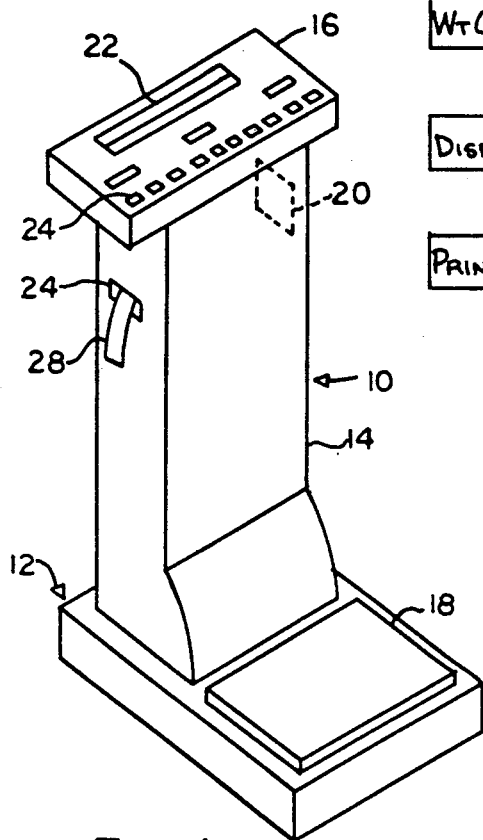
FIG. 1 is a perspective view of a scale-platform massager apparatus of the type incorporating the subject invention.
Figure 4:
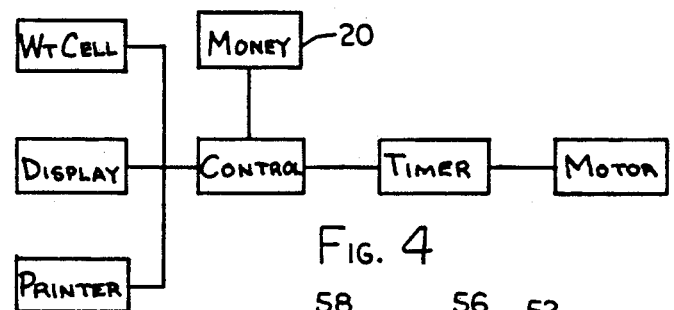
FIG. 4 is a schematic operative control diagram of the disclosed scale-platform massager.
Figure 3:
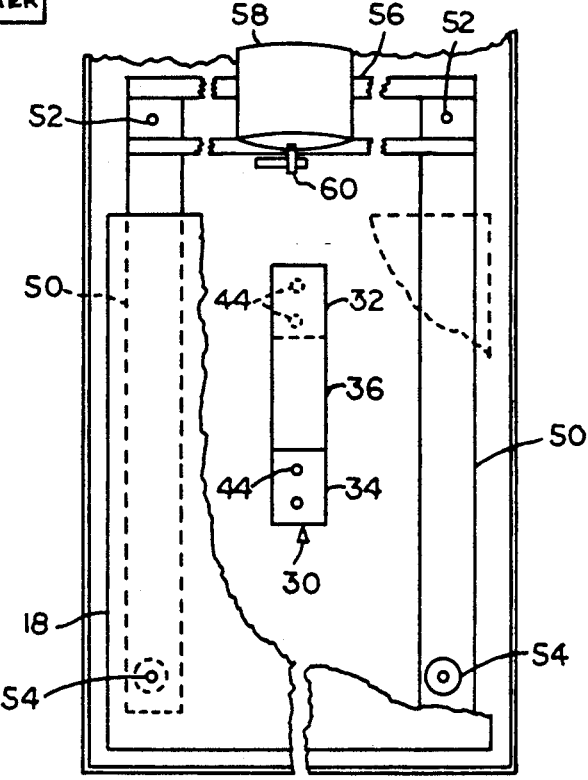
FIG. 3 is a top plan view, partly broken away for clarity of disclosure, of the scale-platform massager apparatus of FIGS. 1 and 2.
Figure 2:
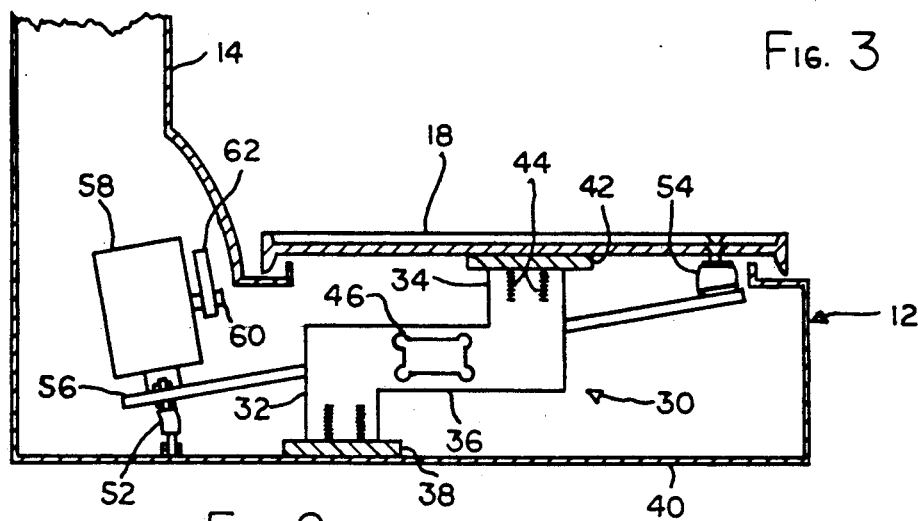
FIG. 2 is an enlarged side elevational view of the scale-platform massager apparatus of FIG. 1, showing additional details of construction.

FIG. 1 illustrates in perspective a commerical coin-operated scale-platform massager apparatus 10 of this invention. The apparatus 10 has a frame 12 including an upstanding pedestal 14 and a display and control panel 16. A foot platform 18 is mounted on the frame 12 in front of the pedestal 14 at a height suited to have someone stand on it; and the display and control panel 16 will line up approximately between waist and chest height relative to an average adult person, to allow easy control and operation of the apparatus.

The frame 12 and pedestal 14 are hollow, to enclose and house the operative components of the apparatus. These would include a money collector for coins and/or bills; a printed for preparing written outputs of the apparatus; a roll of paper for the printer; and appropriate controls between these components and others to be disclosed. These components as well as the operative circuits between them may be of any conventional construction, and thus are not illustrated in detail.

Thus, money-collector 20 (shown in phantom only as an outline in FIG. 1) may be supported on the hidden side of the pedestal 14, to receive the appropriate coin or paper denomination of money, to register it when deposited, and then to allow the operation of the apparatus to proceed. The display and control panel 16 may have a display region 22 and several selector control buttons 24, to allow the user to input to the apparatus 10 the intended function desired (weighing, vibrating or both) and any information needed for the operation of such. A paper dispensor slot 26 may be provided in the visible side of the pedestal, to allow a printed readout 28 to be dispensed from the printer for making a permanent record of any yielded information from the apparatus, including possibly the user's weight.

Referring now to the manner of support of the foot platform 18, a Z-shaped weight cell 30, having solid block end sections 32 and 34 and an intermediate sensing section 36, is mounted with its opposite end sections solidly connected relative to the frame 12 and to the foot platform, respectively. To provide that the connections with the end sections 32 and 34 are solid, reinforcing bar 38 may be secured rigidly to base wall 40 of the frame, and reinforcing bar 42 may be secured to the underside of the foot platform 18. Threaded bolts 44 may be snugged tightly into taps in the end sections 32 and 34 of the weight cell 30. The end section 34, when connected, will be generally centered relative to the foot platform 18 and the foot platform will otherwise be spaced from the frame 12 to be movable relative to the frame as more or less weight in placed on the platform.

The weight cell 30 effectively provides the primary support for the foot platform 18, and all of this support must be carried by the sensing section 36 in a cantilevered orientation. The sensing section 36 is specifically sculptured to provide four narrow strain regions 46 and strain guages (not shown) are secured operatively at these strain regions. The strain gauges are connected in an appropriate control network, such as an electrical bridge (not illustrated), to provide output signals that are extremely sensitive to minor changes of shape and/or position of the gauges, and that are progressively increased as the foot platform moves vertically downward incidental to increased weights being added to the foot platform. Suitable controls are provided to convert the output signals to weight units, to distinguish and specify these different weights, and to provide these as outputs at display 22 and/or printed readout 28.

Inasmuch as the components may be conventional, this disclosure is sketchy and sufficient only to understand the overall weighting operation of the scale portion of the apparatus 10.

Also provided are a pair of structural linkage bars 50, underlying and extended front-to-rear of the foot platform 18. Snubber means 52 connect the bars 50 near the rear ends thereof to the frame base wall 40, and snubber means 54 connect the bars 50 near the front ends thereof to the foot platform 18. The snubber means 52 and 54 are at spaced locations along the linkage bars 50 and are spaced from the weight cell 30. Structural cross braces 56 span between and are secured to the bars 50, near the rear ends thereof, and an electric motor 58 is connected to the cross braces, aligned somewhat with the side-to-side center of the foot platform 18. The rotary output shaft 60 of the motor 58 is aligned generally horizontally, or normal to the vertical movement of the foot platform 18 when subjected to different weights. A weight 62 is keyed eccentrically to the motor shaft 60.

The motor 58, with its eccentrically loaded output shaft 60, establishes a powered vibrator, which is connected via the substantially rigid or nondeformable cross braces 56 and bars 50 to the foot platform 18. The snubber means 52 illustrated includes separate mounting bolts interconnected by an intermediate deformable rubber mass, and the snubber means 54 illustrated includes separate end holders containing an intermediate deformable rubber mass. The snubber means will allow slight movements, horizontally and vertically, of the motor 58 relative to the frame wall 40 or of the bars 50 relative to the foot platform 18, while the bars are effective to transmit forces between the vibrating motor and the foot platform.

Operation of the motor 58 thus vibrates the foot platform 18, in both vertical and side-to-side horizontal directions, with typically very small strokes as might be allowed by the solid connection of the foot platform by the weight cell 30. The presence of the powered vibrator connected via the snubbers 54 to the foot platform 18 and the vibrations of the foot platform do not appear to distort the weight detected by the weight cell 30 once having been calibrated. The tightness or firmness of the snubber means 52 and 54 will determine the intensity of the vibration of the foot platform, as will the rotary speed of the motor, the size and offset of the eccentric weight 62, the location along the bars 50 between the snubbers 52 and 54 of the motor support cross braces 56, and the location front-to-rear along the foot platform 18 of the snubbers 54. A conventional electric motor could be used, having between 1000 and 1750 RPM.

Appropriate controls including the proper deposit of money in the money collector 20 can be activated to operate the vibrator motor 58, typically for a timed duration. The vibrating foot platform 18 converts the foot platform 18 used in the scale or weighting mode into a platform or foot massager.

Thus, a truely cooperative coin-operated commerical apparatus is defined, satisifing both real and impulse needs, such as of a tired shopper or brouser. The apparatus can be used singularly as either a scale or a platform massager, or sequentially as both. A sequence of operation might operate the weight cell 30 first to determine the weight of the person standing on the foot platform, and while the output is being processed including generating the printed readout 28, the driving vibrator motor 58 can be operated to vibrate the foot platform 18 to define a platform massager.

While only a single embodiment of the invention has been illustrated, it is apparent that variations may be made therefrom without departing from the inventive concept. Accordingly, the invention is to be limited only by the scope of the following claims.

What is claimed as my invention is:

1. A scale-platform massager apparatus, comprising the combination of:
   a frame;
   a foot platform, and means supporting the foot platform movably relative to the frame operable to bear the weight of a person standing on the foot platform and being calibrated to determine the weight of the person;
   means to massage the person standing on the foot platform comprising a driving vibrator, means in the form of deformable snubber means for mounting the driving vibrator movably relative to the frame operable to allow slight movements, horizontally and vertically, of the driving vibrator relative to the frame, means connecting the driving vibrator relative to the foot platform operable when the driving vibrator is activated to vibrate the foot platform relative to the frame; and
   said means mounting the driving vibrator movably relative to the frame being in the form of cross braces connected between the snubber means at locations rearwardly of said foot platform supporting means; and said driving vibrator being mounted on and carried by the cross braces.

2. A scale-platform massager apparatus according to claim 1, further comprising the combination of said driving vibrator being in the form of a motor having a rotary output shaft and a weight keyed eccentrically relative to the shaft.

3. A scale-platform massager apparatus according to claim 1, further comprising the combination of said foot platform supporting means being in the form of a weight cell having a cantilevered sensing section between the frame and foot platform, operable to provide output signals that may be calibrated to determine the weight of the person standing on the foot platform.

4. A scale-platform massager apparatus according to claim 1, further comprising the combination of said means connecting the driving vibrator relative to the foot platform being in the form of a pair of bars spaced respectively on opposite sides of the foot platform supporting means, and means connecting the bars relative to the foot platform and to the driving vibrator at the snubber means.

5. A scale-platform massager apparatus according to claim 4, further comprising the combination of said driving vibrator being in the form of a motor having a rotary output shaft and a weight keyed eccentrically relative to the shaft.

6. A scale-platform massager apparatus according to claim 5, further comprising the combination of said rotary output shaft of said motor being substantially horizontal, and extended front-to-rear of the apparatus.

7. A scale-platform massager apparatus according to claim 5, further comprising the combination of said foot platform supporting means being in the form of a weight cell having a cantilevered sensing section between the frame and platform, operable to provide output signals that may be used to determine the weight of said person standing on the foot platform.

8. A scale-platform massager apparatus, comprising the combination of:
   a frame;
   a foot platform;
   a weight cell connected between the frame and foot platform for providing the primary support of the foot platform movably relative to the frame, and said weight cell having a sensing section between the frame and foot platform operable to provide output signals that may be calibrated to determine the weight of the person standing on the foot platform;
   means to massage the person standing on the foot platform comprising a driving vibrator, and means operatively connecting the driving vibrator relative to the foot platform, operable when the driving vibrator is activated to vibrate the foot platform relative to the frame; and
   a money-collector, to receive the appropriate denomination of money, and to allow the operation of the weight cell and driving vibrator to proceed.

9. A scale-platform massager apparatus according to claim 8, further comprising the combination of said weight cell being Z-shaped and having an intermediate cantilevered sensing section extended between the frame and foot platform means.

10. A scale-platform massager apparatus, comprising the combination of:
    a frame;
    a foot platform;
    a Z-shaped weight cell connected at its opposite ends to the frame and to the foot platform for providing the primary support of the foot platform movably relative to the frame;
    said weight cell having an intermediate cantilevered sensing section extended between the frame and foot platform means operable to provide output signals that may be calibrated to determine the weight of the person standing on the foot platform; and
    means to massage the person standing on the foot platform comprising a driving vibrator, and means operatively connecting the driving vibrator relative to the foot platform, operable when the driving vibrator is activated to vibrate the foot platform relative to the frame.

11. A commerical coin-operated scale-platform massager apparatus, comprising the combination of:
    a frame supporting a display and control panel;
    a foot platform, a weight cell, means mounting the weight cell at opposite end connections to the frame and to the foot platform, respectively, and the end connection of the weight cell to the foot platform being generally centered relative to the foot platform;
    the weight cell providing the primary support for the foot platform, operable to bear the weight of a person standing on the foot platform and being calibrated to determine the weight of the person and provide an output at the display and control panel;
    a driving vibrator, and snubber means mounting the driving vibrator and allowing slight horizontal and vertical movements thereof relative to the frame;
    means connecting the driving vibrator relative to the foot platform, operable when the driving vibrator is activated to vibrate the foot platform relative to the frame;
    said connecting means being in the form of a pair of bars spaced respectively on opposite sides of the weight cell and underlying and extended front-to-rear of the foot platform, and means connecting the bars relative to the driving vibrator and to the platform;
    said driving vibrator being in the form of an electric motor having an output shaft and an eccentric weight keyed to the motor shaft, operable when activated to vibrate the foot platform relative to the frame; and
    a money-collector, to receive the appropriate denomination of money, to allow the operation of the weight cell and driving vibrator to proceed.

12. A scale-platform massager apparatus according to claim 11, further comprising the combination of printer means carried by the frame and operable to provide a printed readout to be dispensed from the scale for a permanent record of any information including the weight of the user.

* * * * *